United States Patent [19]
Guentner et al.

[11] Patent Number: 5,760,313
[45] Date of Patent: Jun. 2, 1998

[54] FORCE SENSOR WITH MULTIPLE PIECE ACTUATION SYSTEM

[75] Inventors: Ronald E. Guentner, Shannon; D. Joseph Maurer, Pearl City; Alan V. Sheriff, Freeport, all of Ill.

[73] Assignee: Honeywell Inc., Minneapolis, Minn.

[21] Appl. No.: 810,795

[22] Filed: Mar. 5, 1997

[51] Int. Cl.⁶ ................................................. G01L 3/00
[52] U.S. Cl. .............................. 73/862.584; 73/862.635
[58] Field of Search ................................ 73/727, 862.584, 73/862.625, 862.631, 862.635, 862.636, 862.637, 862.639, 862.642, DIG. 4; 338/47, 42

[56] References Cited

U.S. PATENT DOCUMENTS

| | | | |
|---|---|---|---|
| 2,995,034 | 8/1961 | Boiten | 73/862.635 |
| 3,084,542 | 4/1963 | Statham | 73/862.635 |
| 3,297,971 | 1/1967 | Gindes | 73/862.635 X |
| 3,585,551 | 6/1971 | Scourtes | 73/862.636 X |
| 3,630,071 | 12/1971 | Newhall | 73/862.584 X |
| 3,695,100 | 10/1972 | Mitchell | 73/862.584 |
| 3,866,464 | 2/1975 | Franklin | 73/862.584 |
| 5,184,107 | 2/1993 | Maurer . | |
| 5,187,985 | 2/1993 | Nelson . | |
| 5,327,785 | 7/1994 | Maurer . | |
| 5,353,003 | 10/1994 | Maurer . | |
| 5,410,916 | 5/1995 | Cook . | |
| 5,497,669 | 3/1996 | Hafner | 73/862.636 |

*Primary Examiner*—Elizabeth L. Dougherty
*Attorney, Agent, or Firm*—William D. Lanyi; Ronald W. Norris

[57] ABSTRACT

A force sensor is provided with a two piece actuation system. A first actuator is disposed in contact with the pressure sensitive component and a second actuator is disposed in contact with the first actuator. When an external force is exerted against a distal end of the second actuator, for force is transmitted through the second actuator to the first actuator. The force is then transmitted through the first actuator to the pressure sensitive component. By using a two piece actuation system, the first actuator can be maintained at a constant location in contact with a position on the pressure sensitive component. This position will not vary even when the second actuator is moved or tilted. An elastomeric plate can be used to retain the first actuator in a constant position relative to the pressure sensitive component.

5 Claims, 4 Drawing Sheets

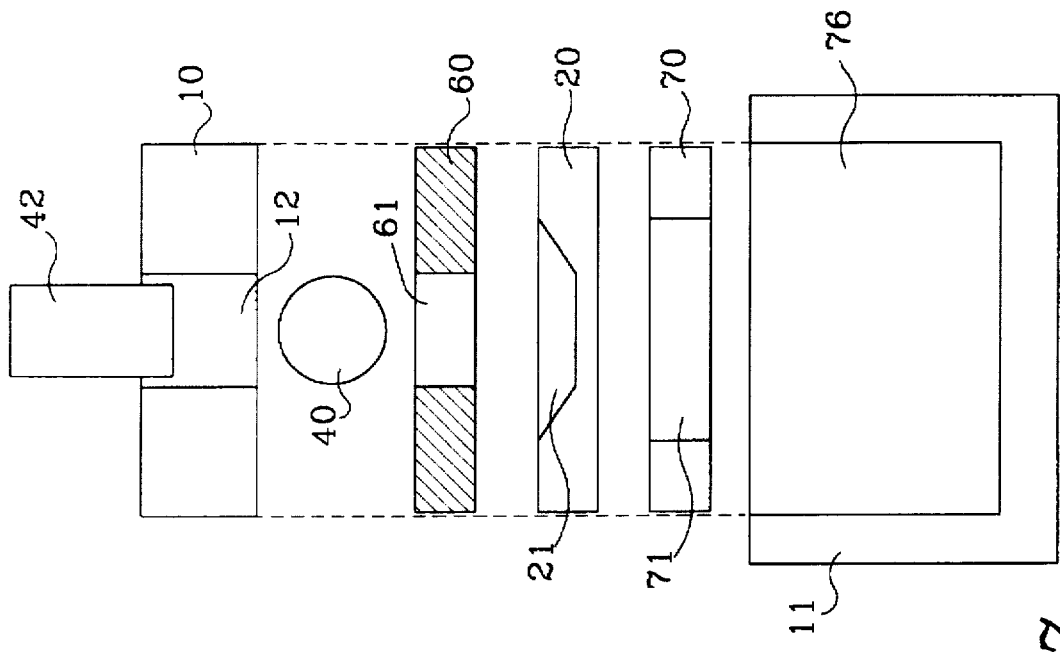
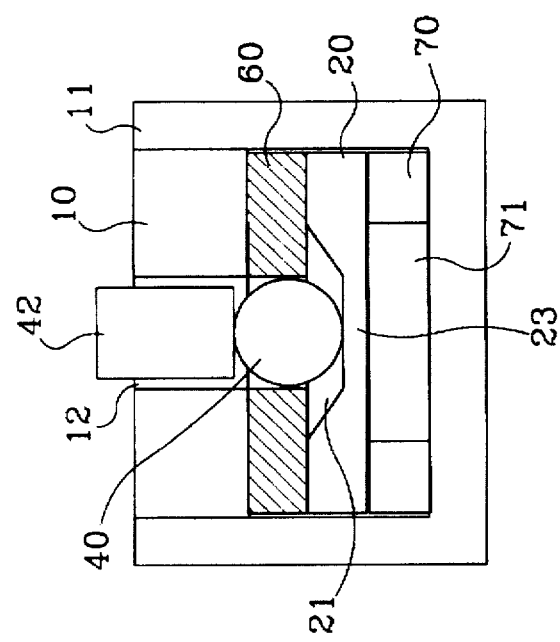

5,760,313

FORCE SENSOR WITH MULTIPLE PIECE ACTUATION SYSTEM

BACKGROUND OF THE INVENTION

1. Field of the Invention

The present invention is generally related to force sensors and, more particularly, to a force sensor that uses two actuators in order to isolate the movement by one actuator and prevent that movement from causing deviations in the contact point between the other actuator and a pressure sensitive component.

2. Description of the Prior Art

Several types of force sensors are known to those skilled in the art. One type of force sensor uses a pressure sensitive component, such as a silicon die, in combination with an actuator that pushes against the die in response to an external force exerted against the actuator. In force sensors of this type, many of the basic packaging techniques are similar to those used in packaging pressure sensors. The pressure sensitive component can comprise a silicon die that is etched to define a diaphragm region against which the actuator is caused to exert a force. The force on the diaphragm region causes it to deflect. Deflection of the diaphragm causes stress to be experienced by one or more piezoresistors disposed on the diaphragm. This change in resistance of the piezoresistors, which is caused by the stress, can therefore be sensed and the magnitude of force can be determined by the change in resistance of the piezoresistors.

U.S. Pat. No. 5,184,107, which issued to Maurer on Feb. 2, 1993, discloses a piezoresistive pressure transducer with a conductive elastomeric seal. The low cost pressure transducer utilizes premolded elastomeric seals in which at least one seal is electrically conductive. A piezoresistive stress sensitive element, in the form of a diaphragm of semiconductor material having a thickened rim, is held at its rim between a pair of premolded elastomeric seals in a two piece housing. Electrical connections with external circuitry are made by conductive paths through one of the elastomeric seals which makes contact with electrical leads which pass through the housing wall.

U.S. Pat. No. 5,187,985, which issued to Nelson on Feb. 23, 1993, describes an amplified pressure transducer. The pressure transducer circuit has a bridge arrangement piezoresistors which are connected to a diaphragm that is sensitive to a pressure which is being monitored. The output of the sensor bridge is provided to a preamplifier which is, in turn, associated with an attenuation network and compensation circuitry. The transducer incorporates a plurality of temperature sensitive resistors within the compensation circuit and these temperature sensitive resistors are produced at the same time and during the same manufacturing step as the piezoresistors of the bridge arrangement. In addition, they are produced using the same dopant and are implanted or diffused in the same semiconductor layer as the piezoresistors. The pressure transducer circuit incorporates a plurality of trimmable resistors which are adjusted during a calibration stage to compensate for temperature variations and nonlinearity of the various components in the circuit. The amplified pressure transducer eliminates the necessity for the use of thermistors to provide this compensation.

U.S. Pat. No. 5,327,785, which issued to Maurer on Jul. 12, 1994, discloses a pressure sensor with improved heat dissipation characteristics. The pressure sensor is provided with the means for efficiently removing heat from a circuit portion of a sensor die by providing an elastomeric member between a first surface of the sensor die and the electrical leads. A thermally conductive, but electrically insulative, portion of the elastomeric member is disposed between the circuit portion of the sensor die and the leads and a means is provided for urging the first surface of the sensor die into thermal communicating contact with the thermally conductive portion of the elastomeric member. In addition, a selectively conductive portion of the elastomeric member is disposed between contact pads on the first surface of the sensor die and electrical leads encapsulated within a portion of the sensor housing. The elastomeric member is also provided with an opening formed therethrough and aligned with the diaphragm portion of the sensor die to permit the media to be in fluid communication with the diaphragm of the sensor die. The improved sensor die arrangement provided by the present invention can be adapted for use in either an absolute pressure sensing embodiment or a differential pressure sensing embodiment.

U.S. Pat. No. 5,410,916, which issued to Cook on May 2, 1995, describes a flowthrough pressure sensor. The flowthrough pressure sensor avoids the creation of crevices and creases that could possibly provide regions which are difficult to clean. The pressure sensor is particularly adapted for use in applications that require cleansing to avoid the buildup of bacterial-laden material. The flowthrough pressure sensor is particular adapted for use in the measurement of bodily fluids. A first conduit is connected in fluid communication with the second conduit which, in turn, is associated with a pressure sensitive element and two compressible seals. A housing member is provided with an opening into which the compressible seals and the pressure sensor element are disposed. A latching mechanism is provided to force the housing against a boss portion of the first conduit so that the seals and the pressure sensitive element are compressed therebetween.

U.S. Pat. No. 5,353,003, which issued to Maurer on Oct. 4, 1994, discloses a force sensor which incorporates a pressure transducer disposed within a housing structure. A force transmitting means, such as a shaft slideable within an opening, is provided to communicate force from an external source to a diaphragm of a pressure sensor. An elastomeric conductor is disposed between electronic components on the diaphragm of a pressure sensor die and conductive leads that are used to communicate signals from the pressure sensor die to components external to the force sensor. In certain embodiments of this device, the force sensor provides a preselected quantity of resilient material between a first end of the slideable shaft and the diaphragm of the pressure sensor die. Other embodiments place the first end of the shaft in direct contact with the diaphragm. The travel of the force transmitting shaft within an opening of the housing structure can be limited either by limiting the amount of extension of the shaft outside of the housing or, alternatively, by providing a travel limit member attached to the shaft and limited in its extent of travel within the housing structure.

In an effort to decrease the cost of force sensors, it would be helpful if the tolerances on certain dimensions of the force sensor package could be relaxed. However, if tolerances are allowed to be increased in an effort to decrease the cost of the sensor, certain consistencies and repeatabilities might be sacrificed. As an example, the actuator shaft of a force sensor is typically disposed in a cylindrical opening that retains the shaft in position and guides its movement when an external force is exerted on the distal end of the actuator that extends external to and away from the force sensor housing. If the cylindrical opening is larger than the shaft diameter, movement of the shaft can occur in directions other than the axial direction parallel to its centerline. When this variability occurs in the movement of the actuator shaft, the tip of the shaft in contact with the pressure sensitive die can possibly make contact with the die at varying locations. When this occurs, identical external forces can result in different output signals from the pressure sensor because the shaft contacts different locations of the pressure sensor in response to the shaft movement. Naturally, this variability is significantly deleterious to the operation of the force sensor.

It would therefore be significantly beneficial if a means could be provided which alleviates the variability of the contact location between an actuator shaft and a pressure sensitive component without requiring excessively stringent tolerances to be maintained on the size of the cylindrical opening in which the shaft moves and in the tolerance of the shaft diameter.

SUMMARY OF THE INVENTION

A force sensor made in accordance with the present invention comprises a housing structure which has an opening formed therein. In most applications, this opening is a cylindrical opening. The force sensor further comprises a pressure sensitive component disposed within the housing structure. In certain preferred embodiments of the present invention, the pressure sensitive component is a silicon die with piezoresistors disposed on a diaphragm formed in the die by etching one of its surfaces. Also, the cylindrical opening formed in the housing structure is generally located so that it extends from the pressure sensitive component to a location external to the force sensor.

The force sensor of the present invention further comprises a first actuator which is disposed in contact with the pressure sensitive component. A second actuator is disposed in contact with the first actuator. The second actuator is disposed within the opening of the force sensor in order to transmit a force from an external source to the first actuator. The first actuator is disposed between the second actuator and the pressure sensitive component in order to transmit the force from the second actuator to the pressure sensitive component.

In a particularly preferred embodiment of the present invention, the first actuator is a spherical member, such as a metallic ball. The force sensor can further comprise a plate that is shaped to retain the first actuator in contact with the pressure sensitive component. It has been found that an elastomeric plate with an opening formed through its thickness serves to perform this function adequately. The spherical first actuator is disposed in the opening of the elastomeric plate which is, in turn, disposed on the pressure sensitive component. The opening in the elastomeric plate holds the ball in place against the diaphragm portion of the pressure sensitive component.

By using a first and second actuator in this way, the variability of contact between the first actuator and the silicon die is significantly reduced and the repeatability of the force sensor is dramatically enhanced.

BRIEF DESCRIPTION OF THE DRAWINGS

The present invention will be more fully and completely understood from a reading of the Description of the Preferred Embodiment in conjunction with the drawings, in which:

FIG. 6 is a representation of the present invention;

FIG. 7 is an exploded view of the force sensor illustrated in FIG. 6; and

DESCRIPTION OF THE PREFERRED EMBODIMENT

Figure 1:
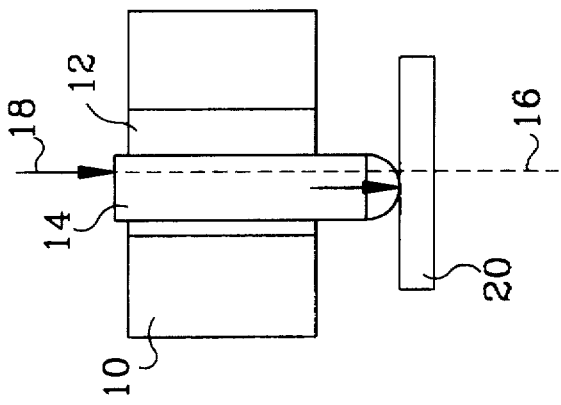
FIGS. 1, 2 and 3 represent force sensors known to those skilled in the art.

Throughout the Description of the Preferred Embodiment, like components will be identified by like reference numerals.

FIG. 1 shows a highly schematic representation of the relevant components of a typical force sensor that is generally known to those skilled in the art. A housing member 10 has an opening 12 extending through it to allow an actuator 14 to move along a path which is generally concentric with the openings centerline identified by dashed line 16. When an external force 18 is exerted against the external distal end of the shaft 14, the force is transmitted by the shaft and is exerted against a pressure sensitive component 20. This transmitted force is represented by the lower arrow in FIG. 1. In FIG. 1, the opening 12 is intentionally exaggerated in size relative to the diameter of the shaft 14 so that certain problems can be described more clearly in relation to FIGS. 2 and 3.

Figure 2:
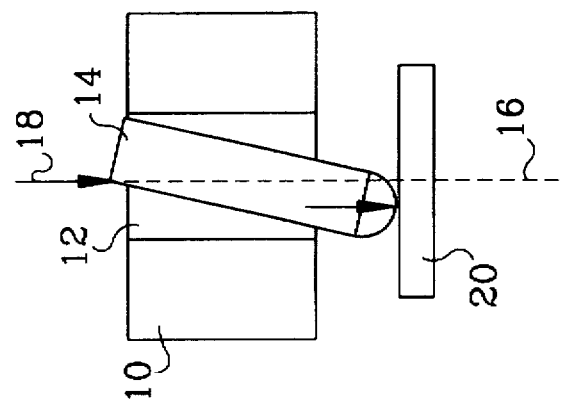

FIG. 2 shows one particular problem that can occur in force sensors known to those skilled in the art. Because of the larger dimension of the opening 12 compared to the diameter of the shaft 14, the shaft can assume a position which is not parallel to dashed line 16. This is illustrated by the exaggerated position of the shaft 14 in FIG. 2. When this occurs, the external force 18 exerted against the distal end of the shaft 14 is transferred by the shaft to the pressure sensitive component 20, but the tip of the shaft 14 in contact with the pressure sensitive component 20 is not coincident with dashed line 16. As a result, the force is exerted on the pressure sensitive component at a point which is different than that where the force is exerted against the pressure sensitive component 20 in FIG. 1. This can cause a significant variability in the output reading from the pressure sensitive component 20 for two consecutive actuations of the force sensor, even if identical external forces 18 are applied in both cases. Naturally, the situation represented in FIG. 2 is significantly detrimental to the accuracy and repeatability of the force sensor.

Figure 3:
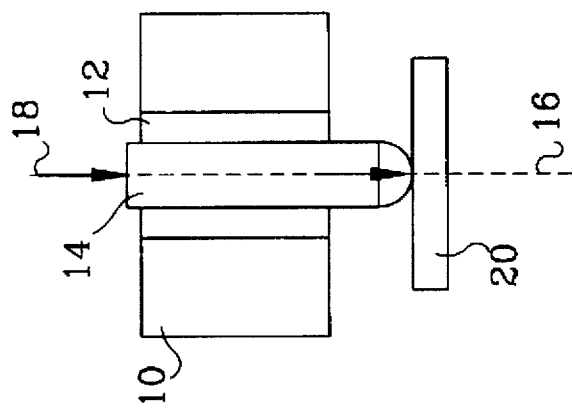

FIG. 3 shows another possible problem that can occur in force sensors known to those skilled in the art. Again, the size of the opening 12 is exaggerated with respect to the diameter of shaft 14 in order to more clearly illustrate the problem. Although the shaft centerline is generally parallel to dashed line 16 in FIG. 3, it is noticeably shifted toward the left of the opening 12. When an external force 18 is exerted against the distal end of the shaft 14, the force is transmitted by the shaft to the pressure sensitive component 20, but the contact point between the bottom tip of the shaft 14 and the pressure sensitive component 20 is shifted away from dashed line 16. As in the case illustrated in FIG. 2, this results in a variable output from the pressure sensitive component 20 even if the external force 18 is identical in all cases.

With continued reference to FIGS. 1, 2 and 3, it should be understood that attempted cost reductions in force sensors can possibly result in wider tolerances in the sensor's dimensions. For example, the tolerance on the shaft diameter and the tolerance on the diameter of the opening 12 can vary from sensor to sensor. The results of this variation can result in the conditions described above in conjunction with FIGS. 2 and 3. Tighter tolerances on the diameters of the shaft 14 and opening 12 can increase the cost of the sensor.

Figure 4:
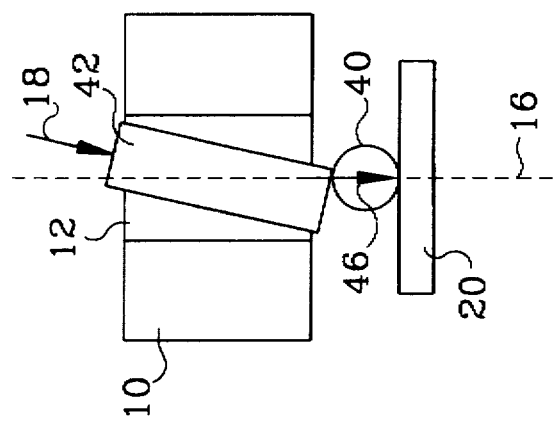
FIG. 4 illustrates a force sensor made according to the present invention.

FIG. 4 illustrates a highly simplified schematic representation of the present invention. Like the force sensors described above in conjunction with FIGS. 1, 2 and 3, the force sensor of the present invention comprises a housing 10 with an opening 12 formed therein. The purpose of the opening 12 is to guide an actuator shaft when it has an external force 18 exerted against its distal end. However, rather than using a shaft that is described above and identified by reference numeral 14 in FIGS. 1, 2 and 3, the present invention utilizes a two piece shaft that comprises a first actuator 40 and a second actuator 42. The first actuator, in a particularly preferred embodiment of the present invention, is a spherical object, such as a metallic ball. The first actuator 40 is disposed in contact with the pressure sensitive component 20 and the second actuator 42 is disposed in contact with the first actuator 40. When an external force 18 is exerted against the external distal end of the second actuator 42, the force is transferred through the second actuator 42 to the first actuator 40 and is then transferred by the first actuator 40 to the pressure sensitive component 20. The advantage of using the two piece constructor for the actuator is that the contact point between the first actuator 40 and the pressure sensitive component 20 can be maintained constant regardless of the relative positions of the second actuator 42 and the opening 12. Therefore, the resulting force 46 on the pressure sensitive component 20 is consistent and is exerted on the same spot of the pressure sensitive component 20.

Figure 5:
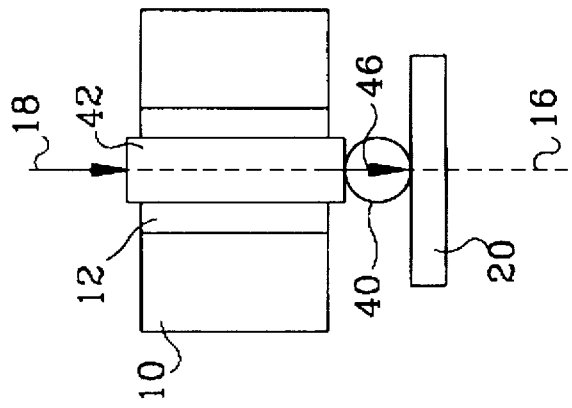
FIG. 5 illustrates how the present invention reacts to a force in an unexpected direction against a portion of the actuation system which is not properly aligned.

FIG. 5 shows a situation that is generally analogous to the situation described above in conjunction with FIG. 2. However, because the present invention utilizes a two piece actuator, the resulting force 46 against the pressure sensitive component 20 is consistently applied to the same position of the pressure sensitive component 20 and in parallel with dashed line 16. This is true even if the second actuator 42 is cocked in opening 12 and the external force 18 is applied in a direction that is not parallel to dashed line 16. These variations in the physical position of the second actuator 42 and the direction of the applied force 18 do not adversely affect the application of the force 46 against the pressure sensitive component 20. Therefore, the relative dimensions of the opening 12 and the shaft 42, is within reasonable range of each other, do not adversely affect the operation of the force sensor. This same advantage is realized if the second actuator 42 is displaced as described above in conjunction with FIG. 3.

FIG. 6 is a slightly more detailed representation of one embodiment of the present invention. The pressure sensitive component 20 comprises a silicon die that has an etched recess 21 which defines a diaphragm portion 23. The diaphragm portion, as is well known by those skilled in the art, can have one or more piezoresistors disposed on its surface. The first actuator 40 is a spherical member, such as a metallic ball, disposed in contact with the diaphragm of the pressure sensitive component 20. A plate 60 has a hole 61 formed through it. In a particularly preferred embodiment of the present invention, the plate 60 is an elastomeric material and the hole 61 is shaped to receive the first actuator 40 within it. This holds the ball in place at its preferred location in contact with a diaphragm 23 of the pressure sensitive component 20. In certain applications of the present invention, another elastomeric member 70, with an opening 71 formed therethrough, is disposed under the pressure sensitive component 20. In certain applications of the present invention, the elastomeric member 70 can be electrically conductive in the direction through its thickness. This type of product is well known to those skilled in the art and is available in commercial quantities. When the second actuator 42 experiences an external force against its distal end, the force is transferred to the first actuator 40, or spherical ball, and to the pressure sensitive component 20. The ball is held in place by the elastomeric plate 60 and the application of the force against the pressure sensitive component is consistent regardless of the precise position of the second actuator 42.

FIG. 7 is an exploded view of the device shown in FIG. 6. An outer housing member 11 is provided with an opening 76 into which the elastomeric conductor 70 is disposed. The pressure sensitive component 20 is then disposed in opening 76 on top of the elastomeric conductor 70. Lastly, the elastomeric plate 60 is disposed on the top surface of the pressure sensitive component 20 and the first actuator 40, or spherical ball, is disposed in the opening 61 of the elastomeric plate 60. The housing member 10, with its opening 12, is disposed over the elastomeric plate 60. Although not illustrated in the Figures, the housing member 10 can be snapped into position in cooperation with the housing member 11 to hold the pressure sensitive component 20 between the elastomeric plate 60 and the elastomeric conductor 70. With the first actuator 40 held in place within the opening 61 of the elastomeric plate, the second actuator 42 is disposed in the opening 12.

The problems related to force sensors have been described in conjunction with FIGS. 1, 2 and 3. The present invention has been illustrated in a high schematic manner in FIGS. 4 and 5 to show the basic concept of the present invention which incorporates a two piece actuator system. In FIGS. 6 and 7, a more detailed representation of the present invention is shown in both an assembled and an exploded view.

Figure 8:
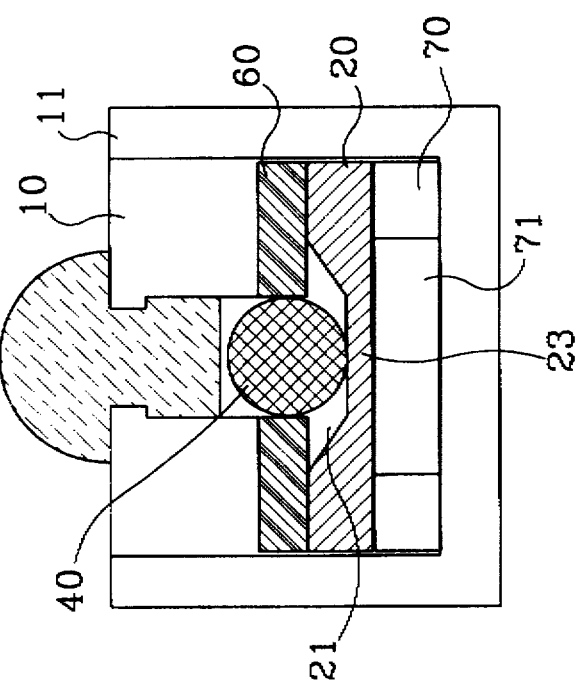
FIGS. 8 and 9 show two alternative embodiments of the present invention.
Figure 9:
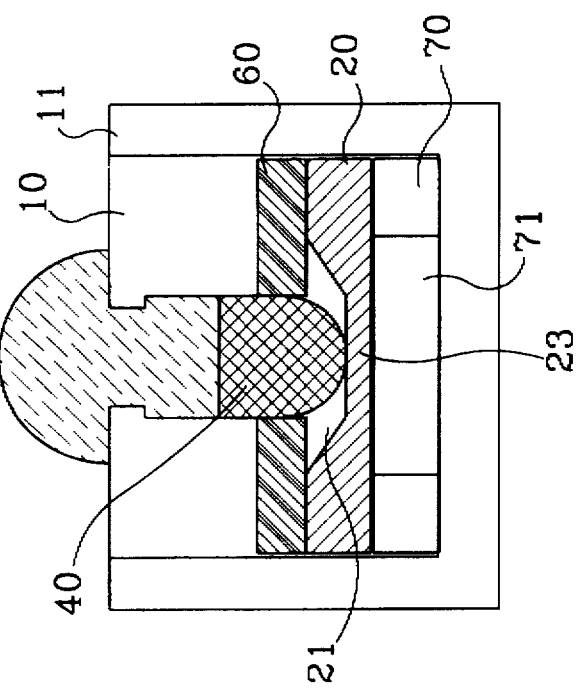

FIGS. 8 and 9 show two different embodiments of the present invention. FIG. 8 illustrates a force sensor that is generally similar to that described above in conjunction with FIG. 6, but where the second actuator 42 is shaped to be confined by the shape of the opening in the housing structure 10.

The embodiment illustrated in FIG. 9 differs from that in FIGS. 6, 7 and 8 by the shape of the first actuator 40. The second actuator 42 is generally the same in FIGS. 8 and 9, but the first actuator 40 in FIG. 9 is not spherical in shape. Instead, it is generally cylindrical with a hemispherical tip disposed in contact with the diaphragm of the pressure sensitive component 20. The embodiments illustrated in FIGS. 6, 7, 8 and 9 are illustrative of the fact that several alternative embodiments exist which are all within the scope of the present invention. The use of a two piece actuator, wherein a first actuator 40 is disposed in contact with the pressure sensitive component 20 and the second actuator 42 is disposed in contact with the first actuator 40 to receive an external force and transmit that force to the first actuator and to the pressure sensitive component 20, is common to all embodiments of the present invention. The shape of the first and second actuators are not limiting to the scope of the present invention and the particular pressure sensitive component 20 used to detect the force and provide a output signal is also not limiting the present invention.

Although the present invention has been in considerable detail and illustrated to show several different embodiments of the present invention, it should be understood that many other embodiments of the present invention are within its scope.

The embodiments of the invention in which an exclusive property or right is claimed are defined as follows:

1. A force sensor, comprising:

a housing structure, said housing structure having an opening formed therein;

a pressure sensitive component disposed within said housing structure;

a singular first actuator disposed in substantially single point contact with said pressure sensitive component;

a second actuator disposed in contact with said first actuator, said second actuator being disposed within said opening to transmit a force from an external source to said first actuator, said first actuator being disposed between said second actuator and said pressure sensitive component to transmit said force from said second actuator to said pressure sensitive component; and a plate, separate from said pressure sensitive component and said actuators located within said opening, shaped to retain said first actuator in contact with said pressure sensitive component, said plate having a through-hole formed therein, said first actuator being disposed within said through-hole.

2. The sensor of claim 1, wherein:

said plate is made of an elastomeric material.

3. The sensor of claim 1, wherein:

said first actuator is a ball.

4. The sensor of claim 1, wherein:

said pressure sensitive component comprises a silicon die having at least one piezoresistive element disposed thereon.

5. A force sensor, comprising:

a housing structure, said housing structure having an opening formed therein;

a pressure sensitive component disposed within said housing structure;

a first actuator disposed in contact with said pressure sensitive component;

a second actuator disposed in contact with said first actuator, said second actuator being disposed within said opening to transmit a force from an external source to said first actuator, said first actuator being disposed inline between said second actuator and said pressure sensitive component to transmit said force from said second actuator to said pressure sensitive component; and a plate, separate from said pressure sensitive component and said actuators shaped to retain said first actuator in contact with said pressure sensitive component, said plate having an opening formed therethrough, said first actuator being disposed within said opening formed through said plate, said plate being made of an elastomeric material, said first actuator being spherical, and said pressure sensitive component comprising a silicon die having at least one piezoresistive element disposed thereon.

* * * * *